United States Patent
Moore et al.

(10) Patent No.: US 11,168,611 B2
(45) Date of Patent: **\*Nov. 9, 2021**

(54) GAS TURBINE ENGINE

(71) Applicant: ROLLS-ROYCE plc, London (GB)

(72) Inventors: Alastair D Moore, Derby (GB); Robert J Telling, Derby (GB)

(73) Assignee: ROLLS-ROYCE PLC, London (GB)

(\*) Notice: Subject to any disclaimer, the term of this patent is extended or adjusted under 35 U.S.C. 154(b) by 294 days.

This patent is subject to a terminal disclaimer.

(21) Appl. No.: 16/423,629

(22) Filed: May 28, 2019

(65) Prior Publication Data

US 2020/0200083 A1    Jun. 25, 2020

(30) Foreign Application Priority Data

Dec. 21, 2018    (GB) .................................... 1820940

(51) Int. Cl.
*F02C 7/045*    (2006.01)
*F01D 25/24*    (2006.01)
(Continued)

(52) U.S. Cl.
CPC .............. *F02C 7/045* (2013.01); *F01D 25/24* (2013.01); *F02C 7/36* (2013.01); *F02K 3/06* (2013.01);
(Continued)

(58) Field of Classification Search
CPC .. F02C 7/045; F02C 7/36; F01D 25/24; F05D 2200/14; F05D 2260/96; F05D 2220/323;
(Continued)

(56) References Cited

U.S. PATENT DOCUMENTS 8,246,292 B1    8/2012    Morin et al.
8,678,743 B1    3/2014    Sheridan et al.
(Continued)

FOREIGN PATENT DOCUMENTS

| EP | 3 115 577 A1 | 1/2017 |
|----|---|---|
| WO | 2014/137685 A1 | 9/2014 |
| WO | 2017/158295 A1 | 9/2017 |

OTHER PUBLICATIONS

Fakhre Ali, Lars Ellbrant, David Elmdahl, Tomas Grönstedt, "A Noise Assessment Framework for Subsonic Aircraft and Engines," GT2016-58012, Proceedings of ASME Turbo Expo 2016: Turbomachinery Technical Conference and Exposition, Jun. 13-17, 2016,. (Year: 2016).*
(Continued)

*Primary Examiner* — Jason H Duger
*Assistant Examiner* — David P. Olynick
(74) *Attorney, Agent, or Firm* — Oliff PLC

(57) ABSTRACT

A gas turbine engine generates noise during use, and one particularly important flight condition for noise generation is take-off. A gas turbine engine has high efficiency together with low noise, in particular the noise emanating from the front of the fan. The contribution of the fan noise emanating from the front of the engine to the Effective Perceived Noise Level (EPNL) at a take-off lateral reference point, defined as the point on a line parallel to and 450 m from the runway centre line where the EPNL is a maximum during take-off, is in the range of from 0 EPNdB and 12 EPNdB lower than the contribution of the fan noise emanating from the rear of the engine to the EPNL at the take-off lateral reference point.

18 Claims, 5 Drawing Sheets

(51) Int. Cl.
  *F02C 7/36* (2006.01)
  *F02K 3/06* (2006.01)
(52) U.S. Cl.
  CPC .... *F05D 2200/14* (2013.01); *F05D 2220/323* (2013.01); *F05D 2240/14* (2013.01); *F05D 2260/40311* (2013.01); *F05D 2260/96* (2013.01)
(58) Field of Classification Search
  CPC ........ F05D 2240/14; F02K 1/34; F02K 1/827; F02K 3/06; F02K 3/067; F02K 3/072
  See application file for complete search history.

(56) References Cited

U.S. PATENT DOCUMENTS

| | | | |
|---|---|---|---|
| 9,932,933 | B2 | 4/2018 | Lord et al. |
| 10,047,699 | B2 | 8/2018 | Sabnis |
| 10,590,851 | B1* | 3/2020 | Moore ............... F02C 7/32 |
| 10,975,802 | B2* | 4/2021 | Moore ............... F02C 7/24 |
| 2002/0061110 | A1 | 5/2002 | Kobayashi |
| 2005/0060982 | A1 | 3/2005 | Mani et al. |
| 2010/0019100 | A1* | 1/2010 | Smith ............... B64C 7/02 244/53 B |
| 2012/0119023 | A1 | 5/2012 | Moore et al. |
| 2013/0202403 | A1 | 8/2013 | Morin et al. |
| 2014/0090923 | A1* | 4/2014 | Murray ............... F02K 3/06 181/222 |
| 2015/0027101 | A1 | 1/2015 | Hasel |
| 2015/0044028 | A1 | 2/2015 | Lord et al. |
| 2016/0010589 | A1 | 1/2016 | Rolt |
| 2016/0017797 | A1 | 1/2016 | Rued et al. |
| 2016/0130949 | A1 | 5/2016 | Morin et al. |
| 2016/0138474 | A1 | 5/2016 | Topol et al. |
| 2016/0146106 | A1 | 5/2016 | Baudoin et al. |
| 2016/0195022 | A1 | 7/2016 | Schwarz |
| 2016/0215729 | A1 | 7/2016 | Sabnis |
| 2016/0352412 | A1 | 12/2016 | Di Costanzo et al. |
| 2017/0175675 | A1 | 6/2017 | Sabnis |
| 2017/0240269 | A1 | 8/2017 | Cox |
| 2017/0306887 | A1 | 10/2017 | Sabnis |
| 2018/0148162 | A1 | 5/2018 | Trahmer |
| 2018/0252166 | A1 | 9/2018 | Pointon et al. |

OTHER PUBLICATIONS

Jon German, Philip Fogel and Craig Wilson, Design and Evaluation of an Integrated Quiet Clean General Aviation Turbofan (QCGAT) Engine and Aircraft Propulsion System, NASA CR—165185, Apr. 1980. (Year: 1980).*

Philip R. Gliebe and Bangalore A. Janardan, "Ultra-High Bypass Engine Aeroacoustic Study," NASA/CR—2003-212525, Oct. 2003. (Year: 2003).*

Hall and Crichton, Engine Design Studies for a Silent Aircraft, Jul. 2007, Journal of Turbomachinery, vol. 129, pp. 479-487 (Year: 2007).

Sayed et al., "Performance Analysis of High Bypass Ratio Turbofan Aeroengine," Jul. 2016, International Journal of Development Research, vol. 06 Issue 07, pp. 8382-8398 (Year: 2016).

Wendus, "Follow-On Technology Requirement Study for Advanced Subsonic Transport" (Aug. 2003), NASA, CR-2003-212467 (Year: 2003).

Rolls Royce, The Jet Engine (2005), Rolls Royce, 5th Edition, Chapter 1.4 (Year: 2005).

Antoine, Nicolas E., Kroo, Ilan, M, "Optimizing Aircraft and Operations for Minimum Noise," AIAA 2002-5868, Oct. 2002. (Year: 2002).

Dennis L. Huff, "Noise Reduction Technologies for Turbofan Engines," NASA/TM-2007-214495, Sep. 2007 (Year: 2007).

Steven Martens, "Jet Noise Reduction Technology Development at GE Aircraft Engines," ICAS 2002 Congress (Year: 2002).

Kaplan, Burak, Nicke, Eberhard, Voss, Christian, "Design of a Highly Efficient Low-Noise Fan for Ultra-High Bypass Engines," GT2006-90363, May 2006. (Year: 2006).

Kurzke, Fundamental Differences Between Conventional and Geared Turbofans (Jun. 2009), ASME, GT2009-59745, All Pages (Year: 2009).

Fledderjohn, TFE731-5: Evolution of a Decade of Business Jet Service (1983), SAE International, 830756, All Pages (Year: 1983).

Wilfert, "Aero-Engine Design: From State of the Art Turbofans Towards Innovative Architectures" (Mar. 2008), von Karman Institute for Fluid Dynamics, Lecture Series 2008-03 (Year: 2008).

Kontos, Janardan and Gliebe, "Improved NASA-ANOPP Noise Prediction Computer Code for Advanced Subsonic Propulsion Systems, vol. 1: ANOPP Evaluation and Fan Noise Model Improvement," NASA CR Report 19580, Aug. 1996 (Year: 1996).

N. Antoine and I Kroo, "Aircraft Optimization for Minimal Environmental Impact," Journal of Aircraft, vol. 41, No. 4, Jul.-Aug. 2004 (Year: 2004).

A J B Jackson, "Optimisation of Aero and Industrial Gas Turbine Design for the Environment," Cranfield University, School of Engineering, PhD Thesis, Feb. 2009. (Year: 2009).

John F. Groeneweg, Thomas G. Sofrin, Edward J. Rice, Phillip R. Gliebe, "Aeroacoustics of Flight Vehicles: Theory and Practice, vol. 1: Noise Sources: Chapter 3—TurboMachinary Noise," NASA Reference Publication 1258, vol. 1, WRDC Technical Report 90-3052, Aug. 1991. (Year: 1991).

Mark H. Waters and Edward T. Schairer, "Analysis of Turbofan Propulsion System Weight and Dimensions,"NASA TM X-73,199, Jan. 1977. (Year: 1977).

M J T Smith and S White, "A Practical Method for Estimating Operational Lateral Noise Levels", ERCD Report 0206, Apr. 2003. (Year: 2003).

Daniel Crichton, Elena de la Rosa Blanco, Thomas R. Law, James I. Hileman, "Design and operation for ultra low noise take-off," AIAA 2007-456, 45th AIAA Aerospace Sciences Meeting and Exhibit 8-11, Jan. 2007, Reno, Nevada. (Year: 2007).

R. E. Owens, "Energy Efficient Engine Propulsion System-Aircraft Integration Evaluation," NASA CR-159488, Mar. 1978. (Year: 1978).

Boeing, "767 Airplane Characteristics for Airport Planning" (PDF), Sep. 2005.

"R. Jeremy Astley, Can technology deliver acceptable levels of aircraft noise?, Nov. 16-19, 2014, inter.noise 2014, Melbourne, Australia" (Year: 2014).

* cited by examiner

GAS TURBINE ENGINE

The present disclosure relates to a gas turbine engine having an improved noise signature.

Gas turbine engines are typically optimized to provide high efficiency, because this generally results in lower fuel burn, and thus lower running costs. However, the noise generated by a gas turbine engine used to power an aircraft is an important factor due to the impact that aircraft noise can have on communities.

In this regard, gas turbine engines generate a significant proportion of the noise produced by an aircraft. Regulations define an "Effective Perceived Noise Level" (EPNL) which is a measure of the impact of the generated noise as perceived by the human ear, taking into account factors such as frequency, absolute level, tonal components and duration of the noise.

A turbofan gas turbine engine comprises a number of different noise sources. For example, the fan itself is a source of noise, and that fan noise can be separated into two distinct components: a component that emanates in a forwards direction from the front of the engine; and a component that emanates in a rearward direction from the rear of the engine. Further noise sources include (but are not limited to) noise from the jet stream exhausted from the engine, noise from the turbine at the rear of the engine, and noise from the installation of the engine on the aircraft.

It is desirable to reduce the perceived noise of a gas turbine engine so as to reduce the impact of the noise on the human ear.

According to an aspect, there is provided a gas turbine engine for an aircraft comprising:

an engine core comprising a turbine, a compressor, and a core shaft connecting the turbine to the compressor;

a fan located upstream of the engine core, the fan comprising a plurality of fan blades; and a gearbox that receives an input from the core shaft (26) and outputs drive to the fan so as to drive the fan at a lower rotational speed than the core shaft, wherein:

the contribution of the fan noise emanating from the front of the engine to the Effective Perceived Noise Level (EPNL) at a take-off lateral reference point, defined as the point on a line parallel to and 450 m from the runway centre line where the EPNL is a maximum during take-off, is in the range of from 0 EPNdB and 12 EPNdB, optionally 0 EPNdB and 10 EPNdB, lower than the contribution of the fan noise emanating from the rear of the engine to the EPNL at the take-off lateral reference point.

According to an aspect, there is provided a method of operating a gas turbine engine attached to an aircraft, wherein the gas turbine engine comprises:

an engine core comprising a turbine, a compressor, and a core shaft connecting the turbine to the compressor;

a fan located upstream of the engine core, the fan comprising a plurality of fan blades; and a gearbox that receives an input from the core shaft (26) and outputs drive to the fan so as to drive the fan at a lower rotational speed than the core shaft, and wherein the method comprises using the gas turbine engine to provide thrust to the aircraft for taking off from a runway, during which:

the contribution of the fan noise emanating from the front of the engine to the Effective Perceived Noise Level (EPNL) at a take-off lateral reference point, defined as the point on a line parallel to and 450 m from the runway centre line where the EPNL is a maximum during take-off, is in the range of from 0 EPNdB and 12 EPNdB, optionally 0 EPNdB and 10 EPNdB, lower than the contribution of the fan noise emanating from the rear of the engine to the EPNL at the take-off lateral reference point.

According to an aspect, there is provided a method of operating an aircraft comprising a gas turbine engine, wherein the gas turbine engine comprises:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, and wherein the method comprises taking off from a runway, during which:

the contribution of the fan noise emanating from the front of the engine to the Effective Perceived Noise Level (EPNL) at a take-off lateral reference point, defined as the point on a line parallel to and 450 m from the runway centre line where the EPNL is a maximum during take-off, is in the range of from 0 EPNdB and 12 EPNdB, optionally 0 EPNdB and 10 EPNdB, lower than the contribution of the fan noise emanating from the rear of the engine to the EPNL at the take-off lateral reference point.

According to an aspect, there is provided a gas turbine engine comprising at least one (for example 2 or 4) gas turbine engine as described and/or claimed herein.

As referred to herein, including in the claims, the Effective Perceived Noise Level (EPNL) is as calculated in the conventional manner, as defined in Appendix 2 of the Fifth Edition (July 2008) of Annex 16 (Environmental Protection) to the Convention on International Civil Aviation, Volume 1 (Aircraft Noise). For completeness, the calculation of the EPNL from measured noise data is as defined in Section 4 of Appendix 2 of the Fifth Edition (July 2008) of Annex 16 (Environmental Protection) to the Convention on International Civil Aviation, Volume 1 (Aircraft Noise), from page APP 2-13 to APP 2-21. For completeness, the EPNL is defined at the reference atmospheric conditions provided in Section 3.6.1.5 of the Fifth Edition (July 2008) of Annex 16 (Environmental Protection) to the Convention on International Civil Aviation, Volume 1 (Aircraft Noise).

Also as referred to herein, the take-off lateral reference point is defined as the point on a line parallel to and 450 m from the runway centre line where the EPNL is a maximum during take-off, as defined in Section 3.3.1, a), 1) of the Fifth Edition (July 2008) of Annex 16 (Environmental Protection) to the Convention on International Civil Aviation, Volume 1 (Aircraft Noise).

Conventionally, the relative contribution of the fan noise emanating from the front of the engine at the take-off lateral reference point would be greater, and in some cases may be higher than the contribution of the fan noise emanating from the rear of the engine (also referred to herein as "rear fan noise") to the EPNL at the take-off lateral reference point. Accordingly, for a given level of rear fan noise, gas turbine engines in accordance with the present disclosure have a lower combined fan front and rear EPNL at the take-off lateral reference point, and thus have a lower noise impact on communities in the vicinity of the runway.

The present inventors have realised that for a given power of gas turbine engine, the use of a gearbox between the fan and the turbine that drives the fan enables the fan forward noise to be reduced relative to the rear fan noise. This may be through using the relatively low rotational speed of the fan (due to the gearbox) for a given engine thrust level to reduce the fan tip Mach number.

According to any aspect, the relative Mach number of the tip of each fan blade may be in the range of from 0.8 M to 1.09 M, optionally 0.9 M to 1.08 M, optionally 1.0 M to 1.07 M, optionally less than 1.09 M at the take-off lateral reference point.

Such a relative Mach number—which is lower than conventional designs—may help to reduce the noise generated by the fan. In particular, having such a fan tip relative Mach number at the take-off lateral reference point ensures that the supersonic noise generated by the fan is kept to an acceptable level, and reduces the level of fan noise propagating forwards of the engine relative to conventional designs. As an additional or alternative benefit, this, in turn, may reduce the amount of acoustic liner required on the intake of the engine, which may facilitate a shorter intake (albeit acoustic liner may be provided to a significant proportion of the intake). For gas turbine engines having the fan diameters referred to herein (which are larger than many previous engines), the intake may contribute significantly to the aerodynamic drag on the engine during use, and so the ability to reduce its extent may be particularly beneficial.

As used herein, the relative Mach number at the tip of the fan blade may be defined as the vector sum of the axial Mach number due to the forward speed of the engine and the rotational Mach number due to the rotation of the fan blades about the engine axis.

The relative Mach number of the tip of each fan blade may not exceed 1.09 M during take-off of an aircraft to which the gas turbine engine is attached. For example, the relative Mach number of the tip of each fan blade may have a maximum value in the range of from 0.8 M to 1.09 M, optionally 0.9 M to 1.08 M, optionally 1.0 M to 1.07 M during take-off of an aircraft to which the gas turbine engine is attached. In this regard, the take-off may be considered to last at least as long as necessary to determine the maximum point of the EPNL between release of brake and top of climb of the aircraft. In practice, this is likely to be within a horizontal distance of 10 km or less of the release of brake.

A bypass duct may be defined between an inner flow boundary formed by the engine core and an outer flow boundary formed by a nacelle. An intake may be defined as the radially outer flow boundary of the flow into the engine upstream of the tips of the leading edge of the fan blades.

According to an aspect, there is provided a gas turbine engine for an aircraft comprising:

an engine core comprising a turbine, a compressor, and a core shaft connecting the turbine to the compressor;

a fan located upstream of the engine core, the fan comprising a plurality of fan blades;

a gearbox that receives an input from the core shaft and outputs drive to the fan so as to drive the fan at a lower rotational speed than the core shaft;

a bypass duct defined between an inner flow boundary formed by the engine core and an outer flow boundary formed by a nacelle; and an intake defined as the radially outer flow boundary of the flow into the engine upstream of the tips of the leading edge of the fan blades, wherein:

a bypass noise attenuation proportion L is defined as:

$$L = \frac{J+H}{2G}$$

where:

G is the axial length between the tip of the trailing edges of the fan blades and the trailing edge of the nacelle;

H is the total axial length of acoustic attenuation material (320) provided to the outer flow boundary of the bypass duct over the axial extent between the tip of the trailing edges of the fan blades and the trailing edge of the nacelle; and J is the total axial length of acoustic attenuation material (330) provided to the inner flow boundary of the bypass duct over the axial extent between the tip of the trailing edges of the fan blades and the trailing edge of the nacelle;

an intake noise attenuation proportion k is defined as:

$$K = \frac{E}{F}$$

where:

E is the total axial length of acoustic attenuation material (310) provided to the intake; and F is the axial length of the intake; and a forward to rearward noise attenuation proportion M is in the range of from 0.8 to 2.5, optionally 1.1 to 2.3, optionally 1.2 to 2.1, optionally 1.3 to 2, optionally 1.4 to 1.8, optionally on the order of 1.6, where:

$$M = \frac{K}{L}$$

Indeed, according to any aspect, a bypass noise attenuation proportion L may be defined as:

$$L = \frac{J+H}{2G}$$

where:

G is the axial length between the tip of the trailing edges of the fan blades and the trailing edge of the nacelle;

H is the total axial length of acoustic attenuation material provided to the outer flow boundary of the bypass duct over the axial extent between the tip of the trailing edges of the fan blades and the trailing edge of the nacelle; and J is the total axial length of acoustic attenuation material provided to the inner flow boundary of the bypass duct over the axial extent between the tip of the trailing edges of the fan blades and the trailing edge of the nacelle.

An intake noise attenuation proportion k may be defined as:

$$K = \frac{E}{F}$$

where:

E is the total axial length of acoustic attenuation material provided to the intake; and F is the axial length of the intake.

A forward to rearward noise attenuation proportion M may be in the range of from 0.8 to 2.5, optionally 1.1 to 2.3, optionally 1.2 to 2.1, optionally 1.3 to 2, optionally 1.4 to 1.8, optionally on the order of 1.6, where:

$$M = \frac{K}{L}$$

The bypass noise attenuation proportion L may be in the range of from 0.4 to 0.7, optionally, 0.45 to 0.65, optionally 0.5 to 0.6.

The intake noise attenuation proportion K may be in the range of from 0.55 to 0.95, optionally, 0.6 to 0.9, optionally 0.7 to 0.8.

Acoustic attenuation material may be material whose primary, or even sole, function is to attenuate noise. Such material may not be provided to the engine but for its acoustic attenuation properties. Such material may comprise holes which are open to the main flow (i.e. the flow containing the noise to be attenuated) on one side. Such holes may open on their other side to cavities. Thus, the acoustic attenuation material may comprise holes that fluidly connect the main flow (e.g. the bypass flow or intake flow) with cavities. The number of cavities may or may not be equal to the number of holes in such an arrangement.

Providing a forward to rearward noise attenuation proportion M and/or a bypass noise attenuation proportion L and/or an intake noise attenuation proportion K in the ranges described and/or claimed herein may result in a gas turbine engine having acceptable fan noise levels, and having improved installation properties, such as acceptably low drag (for example through a shorter than conventional intake section).

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at the take-off lateral reference point may be less than 2800 rpm, for example less than 2500 rpm, for example less than 2300 rpm. Purely by way of further non-limitative example, the rotational speed of the fan at the take-off lateral reference point for an engine having a fan diameter in the range of from 220 cm to 290 cm (for example 230 cm to 270 cm) may be in the range of from 1700 rpm to 2800 rpm, for example in the range of from 2000 rpm to 2600 rpm, for example in the range of from 2000 rpm to 2500 rpm. Purely by way of further non-limitative example, the rotational speed of the fan at take-off lateral reference point for an engine having a fan diameter in the range of from 320 cm to 400 cm (for example 330 cm and 370 cm) may be in the range of from 1200 rpm to 2000 rpm, for example in the range of from 1300 rpm to 1800 rpm, for example in the range of from 1400 rpm to 1600 rpm.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 and 20. For example the bypass ratio may be in the range of from 12.5 to 18, for example 13 to 18, for example 13 to 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

According to any aspect, the ratio of the mean total pressure of the flow at the fan exit that subsequently flows through the bypass duct to the mean total pressure of the flow at the fan inlet, may be in the range of from 1.25 to 1.5, optionally 1.35 to 1.45, at the take-off lateral reference point. This optional feature may, for some arrangements, help to facilitate the average velocity of the flow at the exit to the bypass duct and/or reduced jet noise.

As noted elsewhere herein, the gas turbine engine may further comprise an intake that extends upstream of the fan blades. A radially inner intake length L may be defined as the axial distance between the leading edge of the intake and the leading edge of the fan blades at the hub. The fan diameter D may be the diameter of the fan at the leading edge of the tips of the fan blades. The ratio L/D may be in the range of from 0.2 to 0.5, optionally 0.25 to 0.5, optionally 0.3 to 0.5, optionally 0.32 to 0.49, optionally 0.33 to 0.48.

As noted elsewhere herein, a gas turbine engine has multiple noise sources, only one of which is the noise generated by the fan. For example, for a conventional engine, the noise generated by the jet also contributes significantly to the overall noise of the engine. Accordingly, in some cases, it may be further advantageous to additionally reduce the jet noise In some arrangements, the contribution of the jet to the Effective Perceived Noise Level (EPNL) at the take-off lateral reference point may be in the range of from 0 EPNdB and 15 EPNdB, optionally 2 dB and 12 dB, lower than the contribution of the fan noise emanating from the rear of the engine to the EPNL at the take-off lateral reference point.

The jet noise may comprise noise generated by the flow exiting the core of the engine and the flow exiting a bypass duct. As referred to herein, the bypass duct may be defined radially outside the engine core and a radially inside a nacelle. The majority of the jet noise may be generated by the flow exiting the bypass duct.

The average velocity of the flow at the exit to the bypass duct may be in the range of from 200 m/s to 275 m/s, 200 m/s to 270 m/s, for example 200 m/s to 265 m/s, for example 230 m/s to 265 m/s at the take-off lateral reference point.

Controlling the average velocity of the flow at the exit to the bypass duct to be within the above ranges may at least in part facilitate jet noise reduction, whilst retaining high propulsive efficiency. Without being bound by any particular theory, this may be due to a reduction in the strength of the shear layer between the bypass flow and the surrounding air as the bypass flow exits the engine.

The average velocity of the flow at the exit to the bypass duct at a take-off lateral reference point may be in the range of from 50 m/s to 90 m/s lower, optionally 55 m/s to 85 m/s lower, optionally 60 m/s to 85 m/s lower, than the average velocity of the flow at the exit to the bypass duct at cruise conditions.

Providing and/or operating an engine such that the average velocity of the flow at the exit to the bypass duct at a take-off lateral reference point is in the above ranges lower than at cruise may mean that the noise generated at the take-off lateral reference point is reduced. This may be because of the reduction in the strength of the shear layer between the bypass flow and the surrounding air as the bypass flow exits the engine. In conventional engines, the magnitude of this difference may be lower. In terms of the noise of an aircraft, this may be particularly significant, because the noise generated at take-off, when the aircraft is close to the ground and potentially close to communities, can have more of a significant impact than the noise generated at cruise.

The noise generated by the turbine may also typically contribute significantly to the overall noise of the engine. Accordingly, in some cases, it may be further advantageous to additionally reduce the turbine noise. In this regard, for a given power of gas turbine engine, the use of a gearbox between the fan and the turbine that drives the fan may also enable the turbine noise to be reduced, if desired. This may be because the increased rotational speed of the turbine (relative to the fan) allows the frequency of at least some of the tones generated by the turbine (at least some of which may be referred to as fundamental blade passing frequencies) to be increased. Such increased frequencies may also be subject to an increase in atmospheric attenuation relative to conventional turbine frequencies. As such, these tones are less well perceived by the human ear (and possibly at least some tones are not at all perceived by the human ear), and so are given a lower weighting in the EPNL calculation (even a zero weighting if the frequency is high enough, i.e. not included), thereby reducing the contribution of the turbine noise to the EPNL relative to the rear fan noise.

The turbine that drives the fan via the gearbox may comprise at least two axially separated rotor stages. For example, the turbine that drives the fan via the gearbox may comprise two, three, four, five or greater than five axially separated rotor stages. A rotor stage may be part of a turbine stage that also comprises a stator vane stage, which may be axially separated from the respective rotor stage of the turbine stage. Each rotor stage of the turbine that drives the fan via the gearbox may be separated from at least one immediately upstream and/or downstream rotor stage by a row of stator vanes.

Optionally, the fan diameter may be in the range of from 320 cm to 400 cm, and the turbine that drives the fan via the gearbox may comprise 4 stages. Further optionally, the fan diameter may be in the range of from 220 cm to 290 cm, and the turbine that drives the fan via the gearbox may comprise 3 stages.

The number of turbine blades in the rotor stages of the turbine that drives the fan via the gearbox may influence the frequency of at least some of the tones generated by the turbine, and thus may assist in allowing the fundamental frequency or frequencies to be moved to a range where they are less well perceived by the human ear (and possibly not perceived at all by the human ear).

Each and every one of the rotor stages of the turbine that drives the fan via the gearbox may comprise in the range of from 60 to 140 rotor blades, for example in a range having a lower bound of any one of 70, 75, 80, 85 or 90, and an upper bound of any one of 140, 130, 120 or 110, for example in the range of from 80 to 140 rotor blades.

The average number of rotor blades in a rotor stage of the turbine that drives the fan via the gearbox may be in the range of from 65 to 120 rotor blades, for example in a range having a lower bound of any one of 65, 70, 75, 80, 85 or 90, and an upper bound of any one of 120, 115, 110 or 105, for example in the range of from 85 to 120 rotor blades.

The number of rotor blades in the most axially rearward turbine rotor stage of the turbine that drives the fan via the gearbox may be in the range of from 60 to 120 rotor blades, for example in a range having a lower bound of any one of 60, 65, 70, 75, 80, 85 or 90, and an upper bound of any one of 120, 115, 110 or 105, for example 80 to 120 rotor blades.

In some arrangements, the contribution of the turbine to the EPNL at the take-off lateral reference point may be in the range of from 15 EPNdB and 40 EPNdB lower than the contribution of the fan noise emanating from the rear of the engine to the EPNL at the take-off lateral reference point. In some arrangements, the contribution of the turbine to the EPNL at the take-off lateral reference point may be in the range of from 20 EPNdB and 40 EPNdB, 25 EPNdB and 40 EPNdB, for example 25 EPNdB and 35 EPNdB, for example 27 EPNdB and 33 EPNdB, lower than the contribution of the fan noise emanating from the rear of the engine to the EPNL at the take-off lateral reference point.

In some arrangements, the ratio of the fan diameter to the diameter at the leading edge of the tips of the most axially rearward turbine rotor stage of the turbine that drives the fan via the gearbox is in the range of from 2 to 3, optionally 2.3 to 2.9, optionally 2.4 to 2.8.

Arrangements of the present disclosure may be particularly beneficial for fans that are driven via a gearbox. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any reduction ratio (defined as the rotational speed of the input shaft divided by the rotational speed of the output shaft). For example, the gear ratio may be greater than 2.5 and/or less than 5. By way of more specific example, the gear ratio may be in the range of from 3.2 to 5, or 3.2 or 3.3 to 4.2, or 3.3 or 3.4 to 3.7. By way of further example, the gear ratio may be on the order of or at least 3, 3.1, 3.2, 3.3, 3.4, 3.5, 3.6, 3.7, 3.8, 3.9, 4, 4.1 or 4.2, or between any two of the values in this paragraph. In some arrangements, the gear ratio may be outside these ranges.

As noted elsewhere herein, the turbine that drives the fan via the gearbox may comprise at least two axially separated rotor stages. The turbine that drives the fan via the gearbox may have a rotational speed at the take-off lateral reference point of Wlrp rpm. The minimum number of rotor blades in any single rotor stage of the turbine that drives the fan via the gearbox may be given by NTURBmin. The diameter of the fan may be given by $\phi$fan. A Low Speed System parameter (LSS) may be defined as:

$$LSS = Wlrp \times NTURBmin \times \phi fan$$

The value of the Low Speed System parameter (LSS) may be given by:

$$1.3 \times 10^6 \text{ m·rpm} \leq LSS \leq 2.9 \times 10^6 \text{ m·rpm}$$

The value of the Low Speed System parameter (LSS) may be in a range having a lower bound of any one of $1.3 \times 10^6$ m·rpm, $1.4 \times 10^6$ m·rpm, $1.5 \times 10^6$ m·rpm, $1.6 \times 10^6$ m·rpm, $1.7 \times 10^6$ m·rpm, $1.8 \times 10^6$ m·rpm, or $1.9 \times 10^6$ m·rpm and/or an upper bound of any one of $2.9 \times 10^6$ m·rpm, $2.8 \times 10^6$ m·rpm, $2.7 \times 10^6$ m·rpm, $2.6 \times 10^6$ m·rpm, $2.5 \times 10^6$ m·rpm, $2.4 \times 10^6$ m·rpm, $2.3 \times 10^6$ m·rpm, or $2.2 \times 10^6$ m·rpm.

Providing a gas turbine engine with a Low Speed System parameter (LSS) in the ranges described and/or claimed here has been found to result in a gas turbine engine that has high efficiency (for example due in particular to high propulsive efficiency) and/or high thrust (for example in the range of from 180 kN to 450 kN), but with acceptably low (and/or lower than conventional) noise levels (for example due to particularly low turbine noise propagating from the rear of the engine). The rotational speed of the turbine that drives the fan via the gearbox at the take-off lateral reference point may be the same as, or similar to (for example within 5% of), the maximum rotational speed of that turbine during take-off.

Purely by way of specific example, some gas turbine engines according to the present disclosure may have a turbine rotational speed at the take-off lateral reference point (Wlrp) in the range of from 5300 rpm to 7000 rpm (for example 5700 rpm to 6500 rpm) and/or a fan diameter in the range of from 320 cm and 400 cm (for example 330 cm and 370 cm) and/or a minimum number of rotor blades in any single rotor stage of the turbine that drives the fan via the gearbox (NTURBmin) in the range of from 70 to 120 (for example 80 to 100).

Purely by way of further specific example, some gas turbine engines according to the present disclosure may have a turbine rotational speed at the take-off lateral reference point (Wlrp) in the range of from 8000 rpm to 9500 rpm (for example 8200 rpm to 9200 rpm) and/or a fan diameter in the range of from 220 cm and 290 cm (for example 230 cm and 270 cm) and/or a minimum number of rotor blades in any single rotor stage of the turbine that drives the fan via the gearbox (NTURBmin) in the range of from 60 to 115 (for example 65 to 115, or 70 to 105).

The total number of turbine blades in the turbine that drives the fan via the gearbox may be in the range of from 320 and 540, for example in the range of from 330 to 500, or 340 to 450.

In any gas turbine engine as described and/or claimed herein, a combustor may be provided downstream of the fan and compressor(s), for example axially downstream. For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
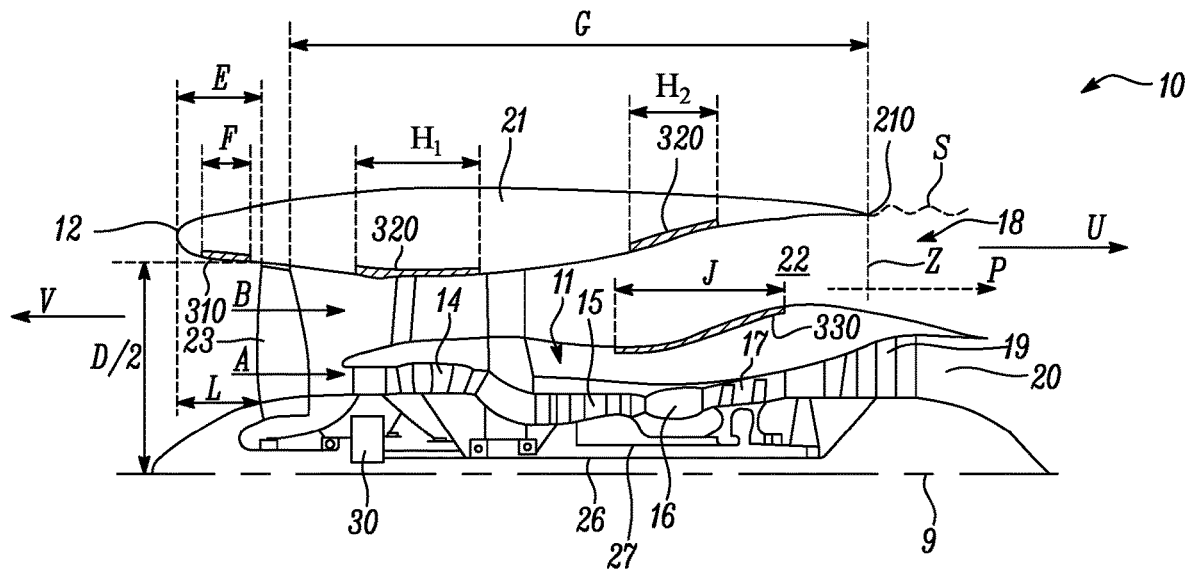
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
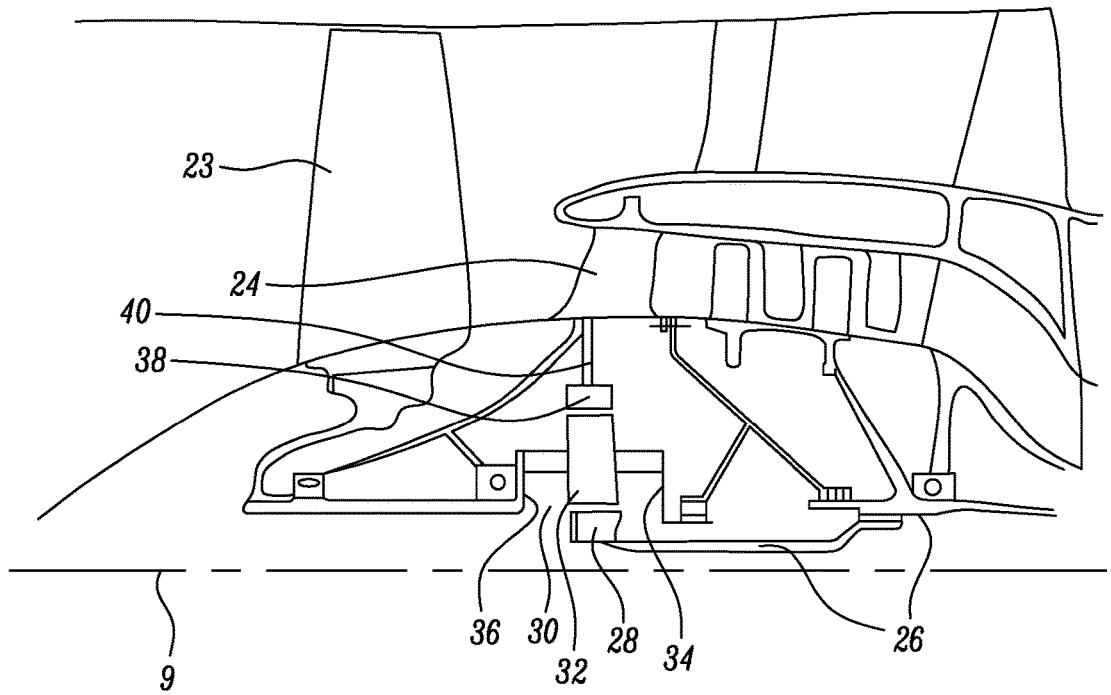
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Accordingly, the low pressure turbine 19 drives the fan 23 via the gearbox 30. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
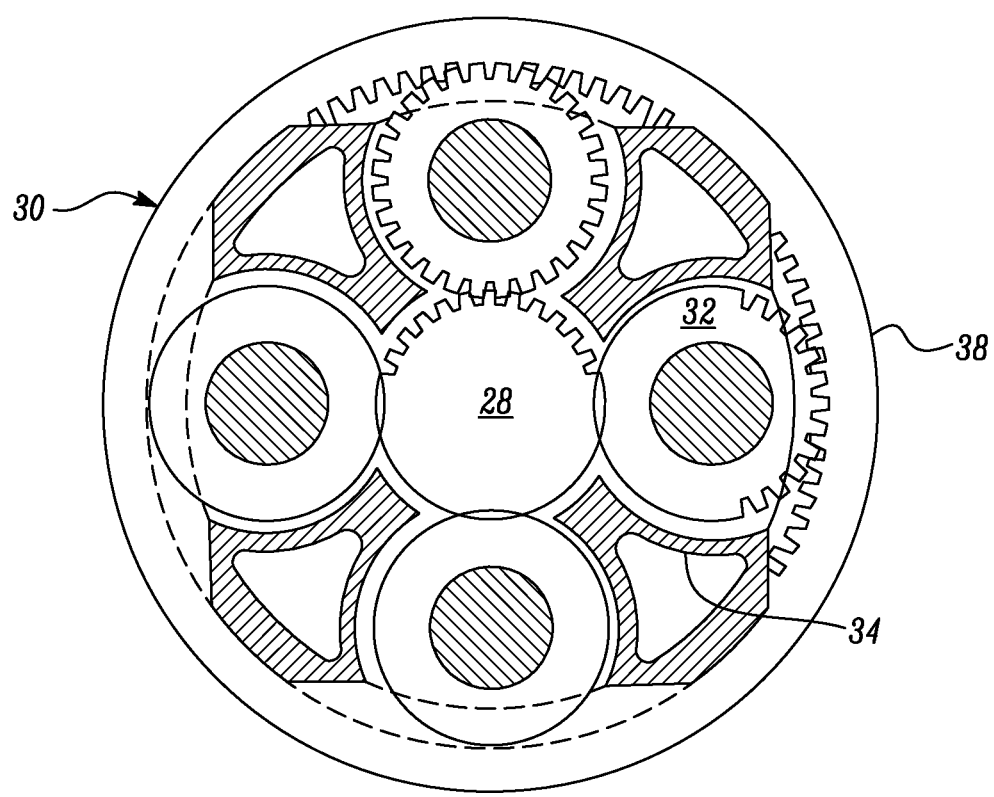
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

When in use to power an aircraft, the gas turbine engine 10 generates noise. As mentioned elsewhere herein, the gas turbine engine 10 according to the present disclosure is arranged to reduce the noise impact whilst providing high efficiency.

Take-off is a particularly important flight condition from a noise perspective, because the engine is typically being operated at a high power condition, and because the engine is close to the ground, and thus potentially close to communities. In order to quantify the impact of the generated noise as perceived by the human ear, an "Effective Perceived Noise Level" (EPNL) is defined. The EPNL takes into account factors such as frequency, absolute level, tonal components and duration of the noise, and is calculated in the manner defined in Appendix 2 of the Fifth Edition (July 2008) of Annex 16 (Environmental Protection) to the Convention on International Civil Aviation, Volume 1 (Aircraft Noise).

A take-off lateral reference point is used in order to quantify the impact of the generated noise specifically during take-off of an aircraft powered by the gas turbine engine 10, as defined in Section 3.3.1, a), 1) of the Fifth Edition (July 2008) of Annex 16 (Environmental Protection) to the Convention on International Civil Aviation, Volume 1 (Aircraft Noise).

Figure 4:
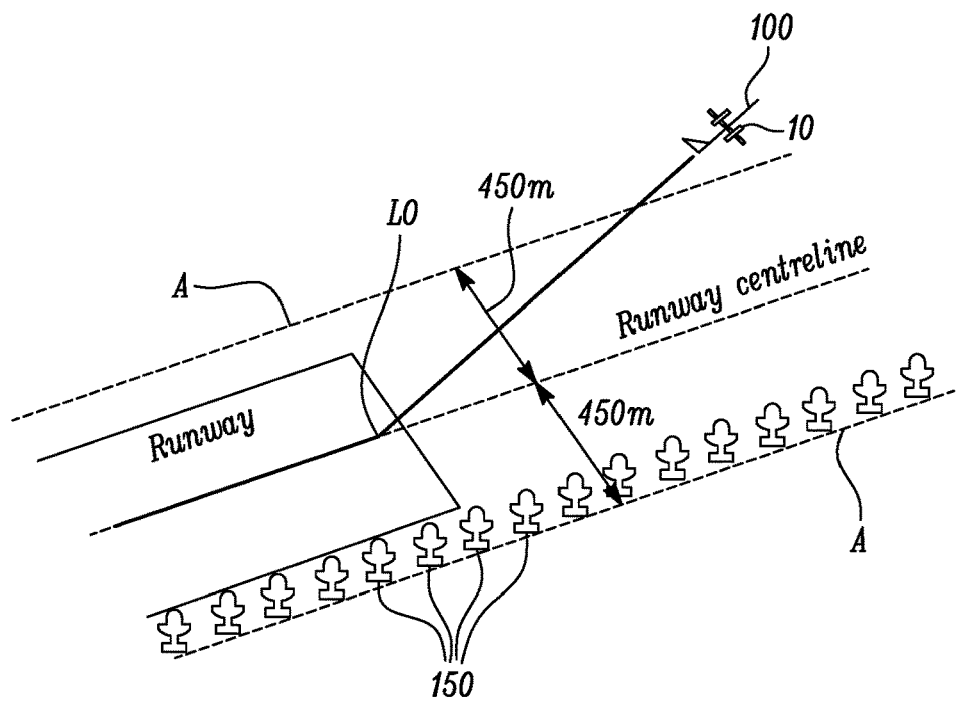
FIG. 4 is a schematic showing the measurement of Effective Perceived Noise Level (EPNL) during take-off.

In particular, the take-off lateral reference point is defined as the point on a line parallel to and 450 m from the runway centre line where the EPNL is a maximum during take-off. This is illustrated in FIG. 4. In particular, FIG. 4 shows a series of noise-measurement devices 150, such as microphones, positioned along a line A on the ground that is 450 m from the take-off path (which may be referred to as the runway centreline) of an aircraft 100 powered by one or more (for example 2 or 4) gas turbine engines 10. Each microphone 150 measures the noise at its respective location during take-off, and the measurements are used to calculate the EPNL at that location. In this way, it is possible to determine the EPNL along the line A (450 m from the runway centreline, extended forwards along the ground after lift-off).

Figure 5:
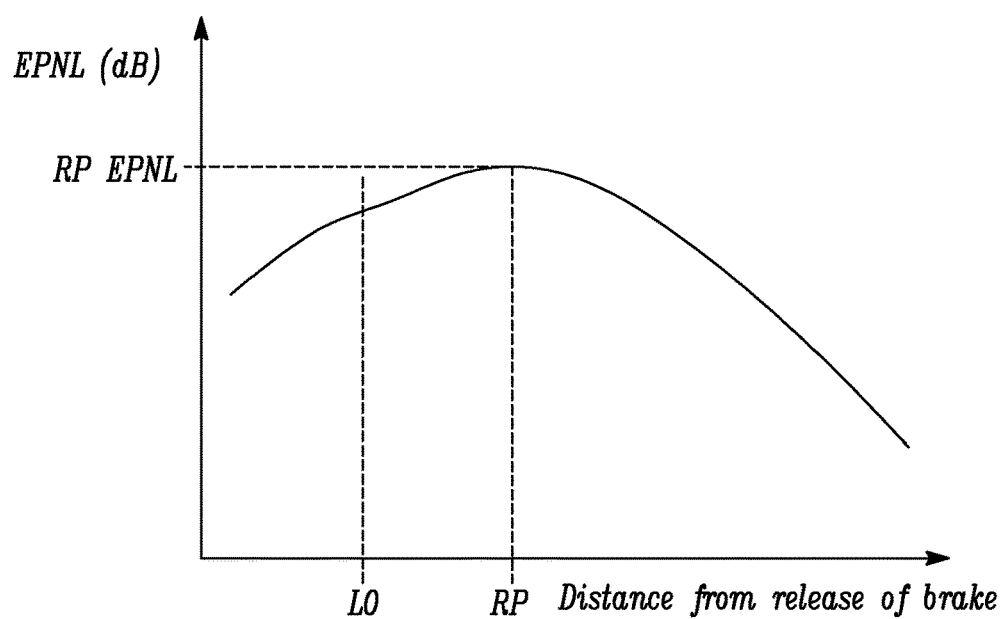
FIG. 5 is a graph showing an example of how the EPNL varies with distance during take-off for an example of a gas turbine engine in accordance with the present disclosure.

FIG. 5 shows an example of a graph showing EPNL in dB (EPNdB) along the line A against the distance from the start of take-off (which may be referred to as distance from release of brake, indicating that it is the distance from the point at which the aircraft starts its main take-off acceleration at the start of the runway). As illustrated, the EPNL of the engine initially increases, and this increase may continue even after lift-off (i.e. after the point at which the aircraft loses contact with the ground), which is labelled as the point "LO" in FIG. 5, purely by way of example.

At a certain position on the flight path, the EPNL (i.e. the EPNL as measured on the ground, along line A in FIG. 4) reaches a maximum, and then starts to fall. The distance along line A (i.e. the distance along the runway centreline) at which this occurs is the take-off lateral reference point (labelled RP in FIG. 5). The EPNL at the take-off lateral reference point RP (labelled RP EPNL in FIG. 5) is the maximum EPNL during take-off.

The take-off period may be considered to last at least as long as necessary to determine the maximum point (at distance RP) of the EPNL between release of brake and top of climb of the aircraft. In practice, this is likely to be within a horizontal distance of 10 km or less of the release of brake.

A number of different noise sources contribute to the EPNL, and thus to the RP EPNL. In a conventional engine, noise from the fan that is emitted from the front of the engine and the rear of the engine produces a significant contribution to the RP EPNL.

The present inventors have found that the contribution to the RP EPNL of the noise emitted from the front of the engine in particular can be significantly reduced through the appropriate use of a gearbox 30 through which the fan 23 is driven by the turbine 19.

Figure 6:
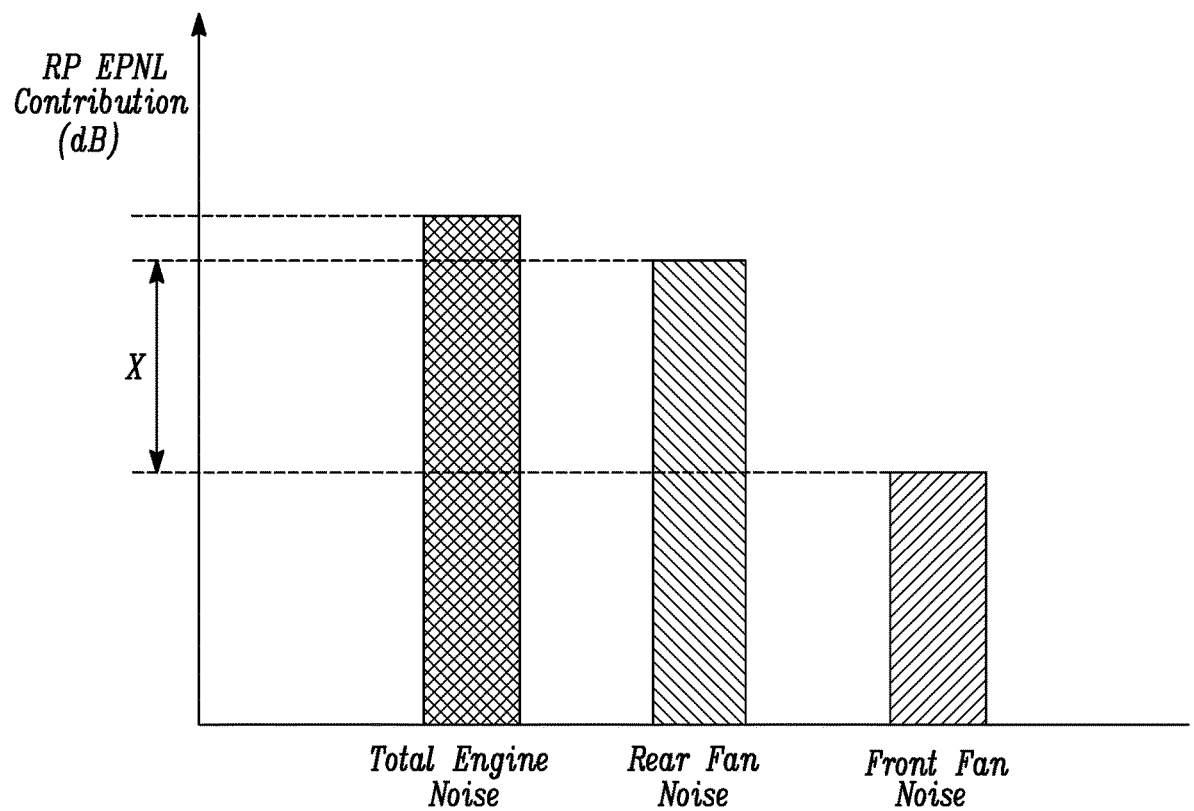
FIG. 6 is a graph showing the contribution of rear fan noise and forward (or front) fan noise to the EPNL at a take-off lateral reference point for an example of a gas turbine engine in accordance with the present disclosure.

FIG. 6 shows the total engine EPNL at the take-off lateral reference point (RP EPNL), along with the contributions to the total engine EPNL at that point of both the rear fan noise and the front fan noise for an example of a gas turbine engine 10 in accordance with the present disclosure. Referring back to FIG. 1, the front fan noise is illustrated by arrow V as the noise from the fan emanating from the front of the engine, and the rear fan noise is illustrated by arrow U as the noise from the fan emanating from the rear of the engine. The contribution of the front fan noise is X EPNdB lower than the rear fan noise contribution, where X is in the range of from 0 EPNdB to 12 EPNdB. Purely by way of non-limitative example, the value of X for the gas turbine engine 10 having the noise characteristic illustrated in FIG. 6 may be on the order of 8 EPNdB.

Accordingly, the gas turbine engine 10 according to the present disclosure can be particularly efficient—for example having high propulsive efficiency through having the fan 23 driven via a gearbox 30—whilst having reduced noise signature due to the relative reduction in noise (as measured by EPNL) of the fan emanating from the front of the engine. Of course, the total engine noise comprises other noise sources in addition to the fan noise, such as (by way of non-limitative example) turbine noise and jet noise.

It will be appreciated that the individual contributions of the components (such as the noise from the fan 23 that emanates from the rear of the engine, the noise from the fan 23 that emanates from the front of the engine, and the noise from the jet and the noise from the turbine 19) can be identified through conventional analysis of the noise measured by the microphones 150. For example, each component has a frequency signature that can be predicted, meaning that noise that is generated in accordance with the predicted frequency signature can be attributed to that component. In practice, the noise that is generated by the fan and emanates from the rear of the engine may be distinguished from the noise that is generated by the fan and emanates from the front of the engine using a source location technique, such as measuring the phase difference of the noise. In this regard, the noise that is generated by the fan and emanates from the rear of the engine is phase-shifted relative to the noise that is generated by the fan and emanates from the front of the engine due to the physical separation of the front and rear of the engine.

Returning to FIG. 1, the flow exiting from the bypass duct 22 is illustrated by arrow P. This flow may be a significant contributor (for example the major contributor) to the jet noise, for example due to the flow P generating a shear layer S with the surrounding air as it exits the engine. The average velocity of the flow P at the exit to the bypass duct may be within the ranges described and/or claimed herein (for example in the range of from 200 m/s to 275 m/s) at the take-off lateral reference condition, thereby reducing noise at that condition. Additionally or alternatively, the average velocity of the flow P at the exit to the bypass duct at the take-off lateral reference point may be in the range of from 50 m/s to 90 m/s lower, optionally 55 m/s to 85 m/s lower, optionally 60 m/s to 85 m/s lower than the average velocity of the flow at the exit to the bypass duct at cruise conditions, thereby reducing noise at the take-off lateral reference point.

The average velocity of the flow P at the exit to the bypass duct 22 may be the mass-averaged flow velocity at the exit plane Z that is perpendicular to the engine axis 9 and passes through the trailing edge 210 of the nacelle 21.

FIG. 1 also shows noise attenuation material 310 provided to an intake of the engine, noise attenuation material 320 provided to the outer flow boundary of the bypass duct, and noise attenuation material 330 provided to the inner flow boundary of the bypass duct.

A bypass noise attenuation proportion L may be defined as:

$$L = \frac{J+H}{2G}$$

where:
G is the axial length between the tip of the trailing edges of the fan blades and the trailing edge of the nacelle;
H is the total axial length of acoustic attenuation material provided to the outer flow boundary of the bypass duct over the axial extent between the tip of the trailing edges of the fan blades and the trailing edge of the nacelle; and
J is the total axial length of acoustic attenuation material provided to the inner flow boundary of the bypass duct over the axial extent between the tip of the trailing edges of the fan blades and the trailing edge of the nacelle.

An intake noise attenuation proportion k may be defined as:

$$K = \frac{E}{F}$$

where:
E is the total axial length of acoustic attenuation material provided to the intake; and
F is the axial length of the intake.

Examples of the lengths E, F, G, H and J are shown in FIG. 1. It will be appreciated that the total axial length of acoustic attenuation material (i.e. the values F, H, and J) may be provided as a single segment (as in the case for F and J in the illustrated example), or in multiple segments (as in the case for H in the illustrated example, which comprises a first segment H1 and a second segment H2, with the value of H being given by H=H1+H2).

A forward to rearward noise attenuation proportion M may be in the ranges described and/or claimed here, for example from 0.8 to 2.5, 1.1 to 2.3, 1.2 to 2.1, 1.3 to 2, 1.4 to 1.8, or on the order of 1.6, where:

$$M = \frac{K}{L}$$

The bypass noise attenuation proportion L may be in the ranges described and/or claimed herein, for example from 0.4 to 0.7, optionally, 0.45 to 0.65, optionally 0.5 to 0.6. The values of H/G and J/G may be within these ranges individually.

The intake noise attenuation proportion K may be in the ranges described and/or claimed herein, for example from 0.55 to 0.95, optionally, 0.6 to 0.9, optionally 0.7 to 0.8.

The acoustic attenuation material may take any suitable form, for example as described elsewhere herein.

A further example of a feature that may be better optimized for gas turbine engines 10 according to the present disclosure compared with conventional gas turbine engines is the intake region, for example the ratio between the intake length L and the fan diameter D. Referring to FIG. 1, the intake length L is defined as the axial distance between the leading edge of the intake and the leading edge of the root of the fan blade, and the diameter D of the fan 23 is defined at the leading edge of the fan 23. Gas turbine engines 10 according to the present disclosure, such as that shown by way of example in FIG. 1, may have values of the ratio L/D as defined herein, for example less than or equal to 0.5, for example in the range of from 0.25 to 0.5, optionally 0.3 to 0.5, optionally 0.32 to 0.49, optionally 0.33 to 0.48. This may lead to further advantages, such as installation and/or aerodynamic benefits, whilst maintaining forward fan noise at an acceptable level.

Figure 8:
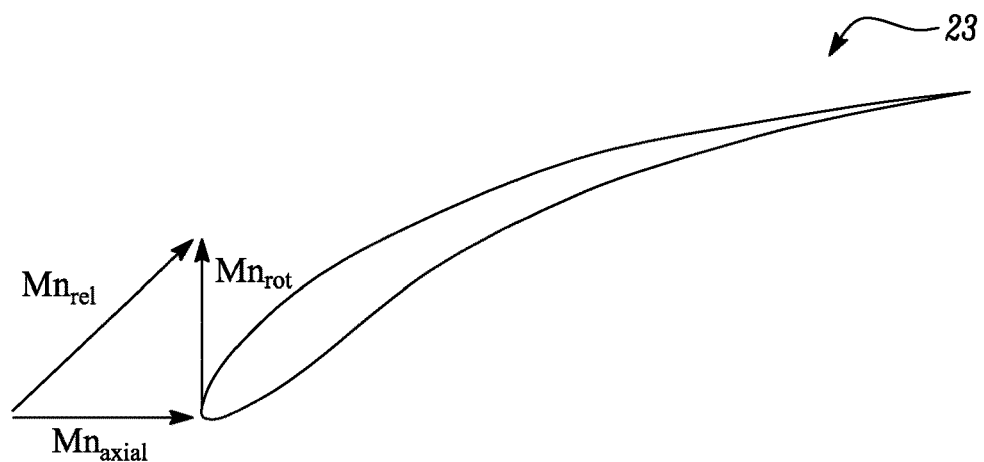
FIG. 8 is a diagram illustrating the calculation of fan tip relative Mach number.

FIG. 8 illustrates a view onto the radially outermost tip of one of the fan blades of the fan 23. In use, the fan blade rotates, such that the tip has a rotational velocity given by the rotational speed of the fan multiplied by the radius of the tip. The rotational velocity at the leading edge of the tip (i.e. using the radius of the leading edge of the tip) can be used to calculate the rotational Mach number at the tip, illustrated by $Mn_{rot}$ in FIG. 8.

The axial Mach number at the leading edge of the tip of the fan blade is illustrated as $Mn_{axial}$ in FIG. 8. In practice (and as used to calculate the fan tip relative Mach number $Mn_{rel}$ as used herein), this may be approximated by multiplying the average axial Mach number over the plane that is perpendicular to the axial direction at the leading edge of the tip of the fan blade by 0.9.

The fan tip relative Mach number ($Mn_{rel}$) is calculated as the vector sum of the axial Mach number $Mn_{axial}$ and the rotational Mach number at the tip $Mn_{rot}$, i.e. having a magnitude $Mnrel = \sqrt{Mnaxial^2 + Mnrot^2}$.

In order to calculate the Mach numbers ($Mn_{axial}$ and $Mn_{rot}$) from the velocities, the average static temperature over the plane that is perpendicular to the axial direction at the leading edge of the tip of the fan blade is used to calculate the speed of sound.

The fan tip relative Mach number ($Mn_{rel}$) may be in the ranges described and/or claimed herein, for example no greater than 1.09 and/or in the range of from 0.8 M to 1.09 M, optionally 0.9 M to 1.08 M, optionally 1.0 M to 1.07 M at the take-off lateral reference point.

Accordingly, the fan noise, including at least the noise propagating from the front of the engine at the take-off lateral reference point, may be reduced compared with engines of comparable size and/or power. Additionally or alternatively, the reduced fan tip relative Mach number may at least in part facilitate a lower jet velocity, which may in turn lead to lower jet noise.

As mentioned elsewhere herein, a number of different noise sources contribute to the EPNL, and thus to the RP EPNL. In a conventional engine, the turbine that drives the fan also provides a significant contribution to the RP EPNL.

However, the contribution to the RP EPNL of the turbine 19 that drives the fan 23 via the gearbox 30 may also be reduced by increasing the frequencies of the fundamental tones generated by the turbine to frequencies that are less well perceived by the human ear and/or have increased atmospheric attenuation, thereby reducing the perceived noise frequency rating. As such, these tones are given a lower weighting in the EPNL calculation (even a zero weighting if the frequency is high enough), thereby reducing the contribution of the turbine noise to the RP EPNL.

Reducing the turbine noise may be particularly beneficial for engines having reduced jet noise and/or reduced forward fan noise, because the contribution of the turbine noise to the overall noise of the engine would otherwise be more significant due to the reduced fan/jet exit noise.

Figure 7:
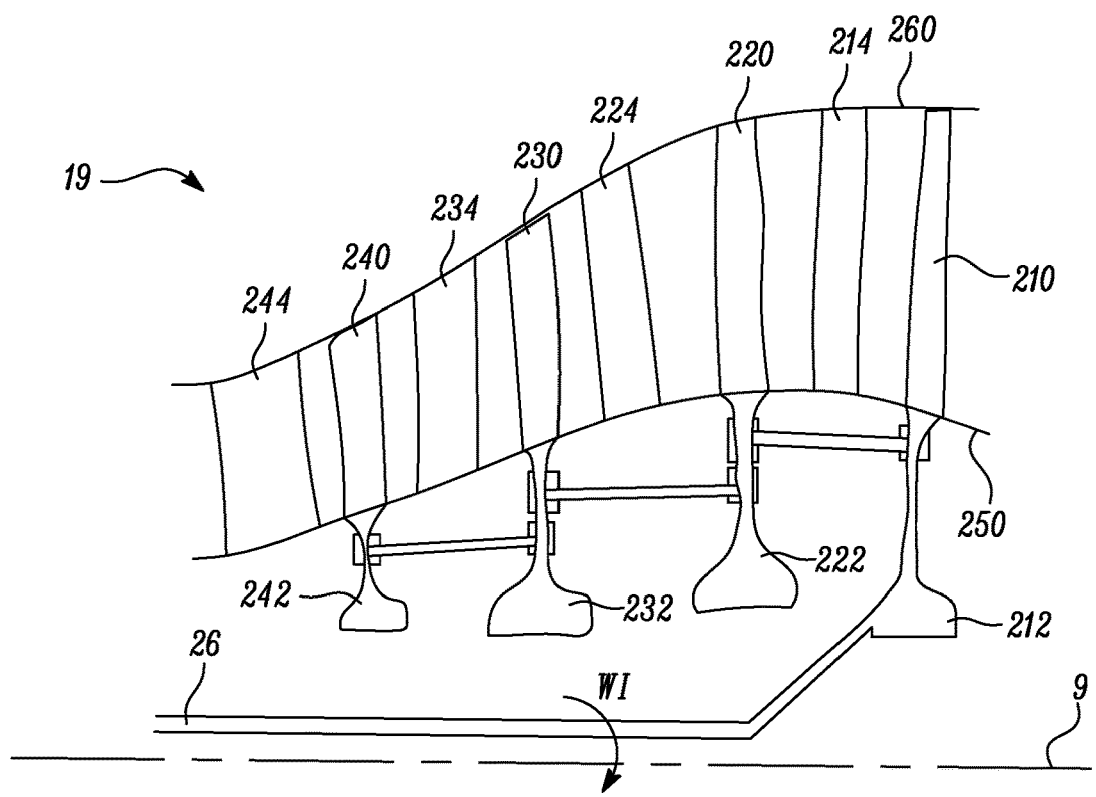
FIG. 7 is a close-up schematic view of the turbine that drives the fan in an example of a gas turbine engine in accordance with the present disclosure.

FIG. 7 shows the turbine 19 that drives the fan 23 via the gearbox 30 in more detail for the gas turbine engine 10 according to an example of the present disclosure, which may be referred to as the low pressure turbine 19. The low pressure turbine 19 comprises four rotor stages 210, 220, 230, 240. The low pressure turbine 19 is therefore a four stage turbine 19. However, it will be appreciated that the low pressure turbine 19 may consist of other numbers of turbine stages, for example three or five.

Each rotor stage 210, 220, 230, 240 comprises rotor blades that extend between an inner flow boundary 250 and an outer flow boundary 260. Each of the rotor stages 210, 220, 230, 240 is connected to the same core shaft 26 that provides input to the gearbox 30. Accordingly, all of the rotor stages 210, 220, 230, 240 rotate at the same rotational speed W1 around the axis 9 in use. In the FIG. 7 example the rotor stages 210, 220, 230, 240 each comprise a respective disc 212, 222, 232, 242 supporting the rotor blades. However, it will be appreciated that in some arrangements the disc may not be present, such that the blades are supported on a circumferentially extending disc.

Each rotor stage 210, 220, 230, 240 has an associated stator vane stage 214, 224, 234, 244. In use, the stator vane stages do not rotate around the axis 9. Together, a rotor stage 210, 220, 230, 240 and its associated stator vane stage 214, 224, 234, 244 may be said to form a turbine stage.

The lowest pressure rotor stage 210 is the most downstream rotor stage. The rotor blades of the lowest pressure rotor stage 210 are longer (i.e. have a greater span) than the rotor blades of the other stages 220, 230, 240. Indeed, each rotor stage has blades having a span that is greater than the blades of the upstream rotor stages.

The number of rotor blades may have an impact on the frequency of the sound generated by the turbine 19. The rotational speed W1 of the low pressure turbine 19 may also have an effect on the frequency of the sound generated by the turbine 19, and this, in turn, is linked to the rotational speed of the fan 23 by the gear ratio of the gearbox 30.

Each rotor stage 210, 220, 230, 240 consists of any desired number of rotor blades. For example, each and every one of the rotor stages 210, 220, 230, 240 of the turbine 19 that drives the fan 23 via the gearbox 30 may comprise in the range of from 80 to 140 rotor blades. By way of further example, the average number of rotor blades in a rotor stage 210, 220, 230, 240 of the turbine 19 that drives the fan 23 via the gearbox 30 may be in the range of from 85 to 120 rotor blades. By way of further example, the number of rotor blades in the most axially rearward turbine rotor stage 210 of the turbine 19 that drives the fan 23 via the gearbox 30 may be in the range of from 80 to 120 rotor blades.

In one particular, non-limitative example, the first (most upstream) rotor stage 240 and the second rotor stage 230 may each comprise around 100 rotor blades, and the third rotor stage 220 and fourth (most downstream) rotor stage 210 may each comprise around 90 rotor blades. However, it will be appreciated that this is purely by way of example, and the gas turbine engine 10 in accordance with the present disclosure may comprise other numbers of turbine blades, for example in the ranges defined elsewhere herein.

At the take-off lateral reference point, the low pressure turbine 19 has a rotational speed of Wlrp rpm. In one example, the low pressure turbine 19 of gas turbine engine 10 has a rotational speed at the take-off lateral reference point in the range of from 5300 rpm to 7000 rpm. In this example, the diameter of the fan 23 (as defined elsewhere herein) may be in the range of from 320 cm to 400 cm. In one specific, non-limitative example, the low pressure turbine 19 of the gas turbine engine 10 has a rotational speed at the take-off lateral reference point of around 5900 rpm, and a fan diameter of around 340 cm.

In one example, the low pressure turbine 19 of gas turbine engine 10 has a rotational speed at the take-off lateral reference point in the range of from 8000 rpm to 9500 rpm. In this example, the diameter of the fan 23 (as defined elsewhere herein) may be in the range of from 220 cm to 290 cm. In one specific, non-limitative example, the low pressure turbine 19 of the gas turbine engine 10 has a rotational speed at the take-off lateral reference point of around 8700 rpm, and a fan diameter of around 240 cm.

A Low Speed System parameter (LSS) may be defined for the gas turbine engine 10 as:

$$LSS = Wlrp \times NTURBmin \times \phi fan$$

where:
Wlrp is the rotational speed at the take-off lateral reference point of the turbine 19 that drives the fan 23 via the gearbox 30 (rpm);
NTURBmin is the minimum number of rotor blades in any single rotor stage 210, 220, 230, 240 of the turbine 19 that drives the fan 23 via the gearbox 30; and
ϕfan is the diameter of the fan (m).

In some arrangements, the Low Speed System parameter (LSS) for the gas turbine engine 10 is in the range:

$$1.3 \times 10^6 \text{ m·rpm} \leq LSS \leq 2.9 \times 10^6 \text{ m·rpm}$$

Purely by way of non-limitative example, the gas turbine engine 10 may have a fan diameter of 3.4 m, a minimum number of rotor blades in any single rotor stage 210, 220, 230, 240 of 100, and a rotational speed at the take-off lateral reference point of the low pressure turbine 19 of 5900 rpm, giving a Low Speed System parameter (LSS) of around $2.0 \times 10^6$.

Purely by way of further non-limitative example, the gas turbine engine 10 may have a fan diameter of 2.4 m, a minimum number of rotor blades in any single rotor stage 210, 220, 230, 240 of 95, and a rotational speed at the take-off lateral reference point of the low pressure turbine 19 of 8700 rpm, giving a Low Speed System parameter (LSS) of around $2.0 \times 10^6$.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives input from the core shaft and outputs drive to the fan so as to drive the fan at a lower rotational speed than the core shaft,
wherein: a contribution of fan noise emanating from a front of the gas turbine engine to an Effective Perceived Noise Level ("EPNL") at a take-off lateral reference point, defined as a point on a line parallel to and 450 m from a runway centre line where the EPNL is a maximum during take-off, is in a range of from 0 EPNdB to 12 EPNdB lower than a contribution of fan noise emanating from a rear of the gas turbine engine to the EPNL at the take-off lateral reference point;
a bypass duct is defined between an inner flow boundary formed by the engine core and an outer flow boundary formed by a nacelle;
an intake is defined as a radially outer flow boundary of a flow into the gas turbine engine upstream of tips of the leading edge of the plurality of fan blades;
a bypass noise attenuation proportion L is defined as:

$$L = \frac{J + H}{2G}.$$

where:
G is an axial length between tips of the trailing edges of the plurality of fan blades and a trailing edge of the nacelle;
H is a total axial length of acoustic attenuation material provided to the outer flow boundary of the bypass duct over an axial extent between the tips of the trailing edges of the plurality of fan blades and the trailing edge of the nacelle; and
J is a total axial length of acoustic attenuation material provided to the inner flow boundary of the bypass duct over the axial extent between the tips of the trailing edges of the plurality of fan blades and the trailing edge of the nacelle;
an intake noise attenuation proportion k is defined as:

$$K = \frac{E}{F}.$$

where:
E is the total axial length of acoustic attenuation material provided to the intake; and
F is the axial length of the intake and a forward to rearward noise attenuation proportion M is in a range of from 0.8 to 2.5,
where:

$$M = \frac{K}{L}.$$

2. The gas turbine engine according to claim 1, wherein the contribution of the fan noise emanating from the front of the engine to the EPNL at the take-off lateral reference point is in range of from 0 EPNdB to 1.0 EPNdB lower than the contribution of the fan noise emanating from the rear of the gas turbine engine to the EPNL at the take-off lateral reference point.

3. The gas turbine engine according to claim 1, wherein a relative Mach number at a tip of each fan blade of the plurality of fan blades does not exceed 1.09 M at the take-off lateral reference point.

4. The gas turbine engine according to claim 1, wherein the intake noise attenuation proportion K divided by the bypass noise attenuation proportion L is in a range of from 1.1 to 2.3.

5. The gas turbine engine according to claim 1, wherein the bypass noise attenuation proportion L is in a range of from 0.4 to 0.7.

6. The gas turbine engine according to claim 1, wherein the intake noise attenuation proportion K is in a range of from 0.55 to 0.95.

7. The gas turbine engine according to claim 1, wherein a gear ratio of the gearbox is in a range of from 3 to 5.

8. The gas turbine engine according to claim 1, wherein:
a fan diameter is in a range of from 320 cm to 100 cm and, when the EPNL at the take-off lateral reference point is a maximum during take-off, the rotational speed of the fan is in a range of from 1300 rpm to 1800 rpm; or
the fan diameter is in a range of from 220 cm to 290 cm, and when the EPNL at the take-off lateral reference point is a maximum during take-off, the rotational speed of the fan at the take-off lateral reference point is in a range of from 2000 rpm to 2800 rpm.

9. The gas turbine engine according to claim 1, wherein, when the EPNL at the take-off lateral reference point is a maximum during take-off, a fan tip pressure ratio, defined as a ratio of a mean total pressure of a low at a fan exit that subsequently flows through the bypass duct to a mean total pressure of a flow at a fan inlet, is in a range of from 1.25 to 1.5.

10. The gas turbine engine according to claim 1, wherein a contribution of the turbine to the EMIL at the take-off lateral reference point is in a range of from 15 EPNdB to 40 EPNdB, lower than the contribution of the fan noise emanating from the rear of the engine to the EPNL at the take-off lateral reference point.

11. The gas turbine engine according to claim 1, wherein: the turbine comprises at least two axially separated rotor stages; and each and every one of the rotor stages of the turbine comprises in a range of from 60 to 140 rotor blades.

12. The gas turbine engine according to claim 1, wherein: the turbine comprises at least two axially separated rotor stages; and an average number of rotor blades in a rotor stage of at least two axially separated rotor stages is in a range of from 65 to 120 rotor blades.

13. The gas turbine engine according to claim 1, wherein: the turbine comprises at least two axially separated rotor stages; and a number of rotor blades in a most axially rearward turbine rotor stage of the at least two axially separated rotor stages is in a range of from 60 to 120 rotor blades.

14. The gas turbine engine according to claim 1, wherein: the turbine is a first turbine, the compressor is a first compressor, and the core shaft is a first core shaft; the engine core further comprises a second turbine, a second compressor, and a second core shaft connecting the second turbine to the second compressor; and the second turbine, the second compressor, and the second core shaft are arranged to rotate at a higher rotational speed than the first core shaft.

15. The gas turbine engine according to claim 1, further comprising an intake that extends upstream of the plurality of fan blades, wherein:
a radially inner intake length L is defined as an axial distance between a leading edge of the intake and the leading edges of the plurality of fan blades at a hub;
a fan diameter D is a diameter of the fan at a leading edges of tips of the plurality of fan blades; and
a ratio L/D is in a range of from 0.2 to 0.5.

16. An aircraft comprising the gas turbine engine according to claim 1.

17. A method of operating an aircraft comprising a gas turbine engine, the gas turbine engine comprising:
an engine core comprising a turbine, a compressor, and a core shaft connecting the turbine to the compressor;
a fan located upstream of the engine core, the fan comprising a plurality of fan blades; and a gearbox that receives input from the core shaft and outputs drive to the fan so as to drive the fan at a lower rotational speed than the core shaft, and the method comprising taking off from a runway, during which: a contribution of the fan noise emanating from a front of the gas turbine engine to an Effective Perceived Noise Level ("EPNL") at a take-off lateral reference point, defined as a point on a line parallel to and 450 m from a runway centre line where the EPNL is a maximum during take-off, is in a range of from 0 EPNdB to 12 EPNdB, lower than the contribution of fan noise emanating from a rear of the gas turbine engine to the EPNL, at the take-off lateral reference point, wherein:
a bypass duct is defined between an inner flow boundary formed by the engine core and an outer flow boundary formed by a nacelle;
an intake is defined as a radially outer flow boundary of a flow into the gas turbine engine upstream of tips of the leading edge of the plurality of fan blades;
a bypass noise attenuation proportion L is defined as:

$$L = \frac{J+H}{2G}.$$

where:
G is an axial length between tips of trailing edges of the plurality of fan blades and a trailing edge of the nacelle;
H is a total axial length of acoustic attenuation material provided to the outer flow boundary of the bypass duct over an axial extent between the tips of the trailing edges of the plurality of fan blades and the trailing edge of the nacelle; and
J is a total axial length of acoustic attenuation material provided to the inner flow boundary of the bypass duet over the axial extent between the tips of the trailing edges of the plurality of fan blades and the trailing edge of the nacelle;
an intake noise attenuation proportion L is defined as:

$$K = \frac{E}{F}.$$

where:
E is the total axial length of acoustic attenuation material provided to the intake; and
F is the axial length of the intake; and a forward to rearward noise attenuation proportion NI is in a range of from 0.8 to 2.5, where:

$$M = \frac{K}{L}.$$

18. The method according to claim 17, wherein:
the bypass noise attenuation proportion L is in a range of from 0.4 to 0.7; and/or
the intake noise attenuation proportion K is in a range of from 0.55 to 0.95.

* * * * *